March 13, 1934.  A. Y. DODGE  1,950,976

AUTOMOBILE CONTROL MECHANISM

Original Filed Sept. 12, 1930

INVENTOR.
Adiel Y. Dodge
BY
ATTORNEYS.

Patented Mar. 13, 1934

1,950,976

UNITED STATES PATENT OFFICE 1,950,976

AUTOMOBILE CONTROL MECHANISM

Adiel Y. Dodge, South Bend, Ind., assignor to Bendix Brake Company, South Bend, Ind., a corporation of Illinois Original application September 12, 1930, Serial No. 481,513. Divided and this application January 4, 1932, Serial No. 584,751

3 Claims. (Cl. 74—39)

My invention relates to automotive control mechanism, having particular reference to control means for regulating the speed of the motor associated therewith, and is a division of my co-pending application Serial No. 481,513 filed September 12, 1930.

The primary object of this invention is to automatically control the speed of the vehicle motor under normal driving conditions so that the generator customarily associated with said motor will at all times render a given output of electrical energy. At the same time I propose to so arrange the fuel feed control mechanism that the conventional hand throttle is available to shut off the fuel feed at any time to such a point that the motor idles at what may be regarded as the absolute minimum. The foot actuated throttle or accelerator is so coupled with the fuel feed control means and the hand manipulated throttle that the return spring associated with the accelerator is capable only of returning the fuel feed control valve to a point at which the motor rotates at a secondary idling speed substantially above the absolute minimum.

This secondary speed is predetermined in accordance with the particular type of generator utilized and in this way the generator, which is driven by the motor, provides a predetermined minimum output of electrical energy continuously during the normal operation of the vehicle. When the absolute minimum idling speed is desired the mechanism is so arranged that the hand throttle lever may be manipulated to further reduce the flow of fuel to the engine, but this mechanism is so arranged that the hand lever is automatically rendered temporarily inoperative, once the accelerator control is again utilized, until further operation of the hand lever.

While there are an indeterminate number of valuable uses for such control mechanism, a hook up wherein electric brakes are normally energized through the current output of the generator is illustrated. The diagrammatic illustration includes means whereby the power source may be shifted from the generator to a conventional storage battery when the generator output falls below a predetermined minimum, which minimum, as hitherto stated, is predetermined by the secondary minimum idling speed of the motor.

Figure 1:
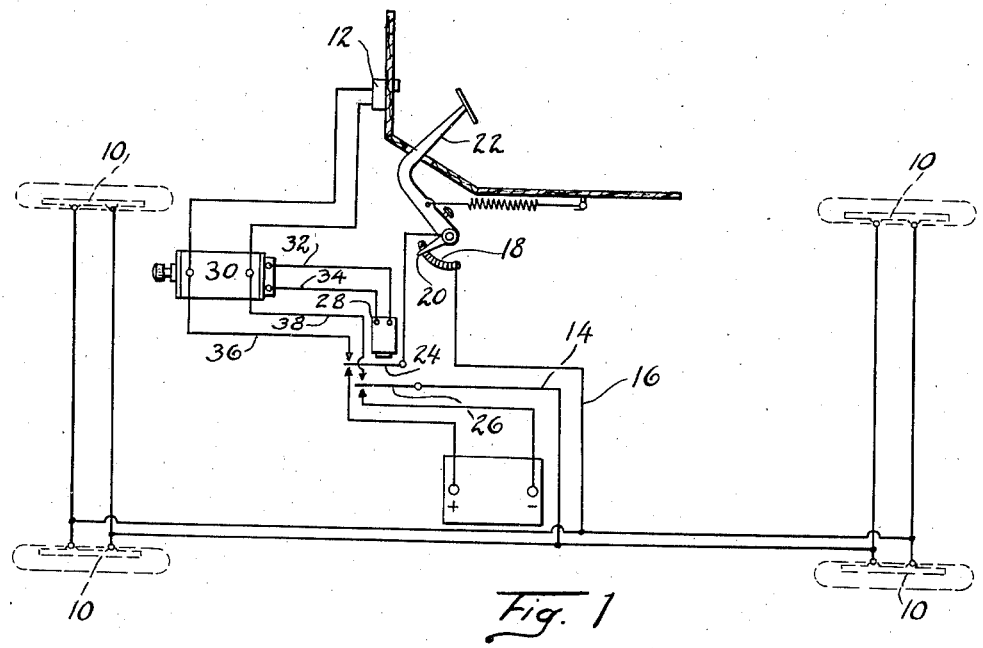
Figure 2:
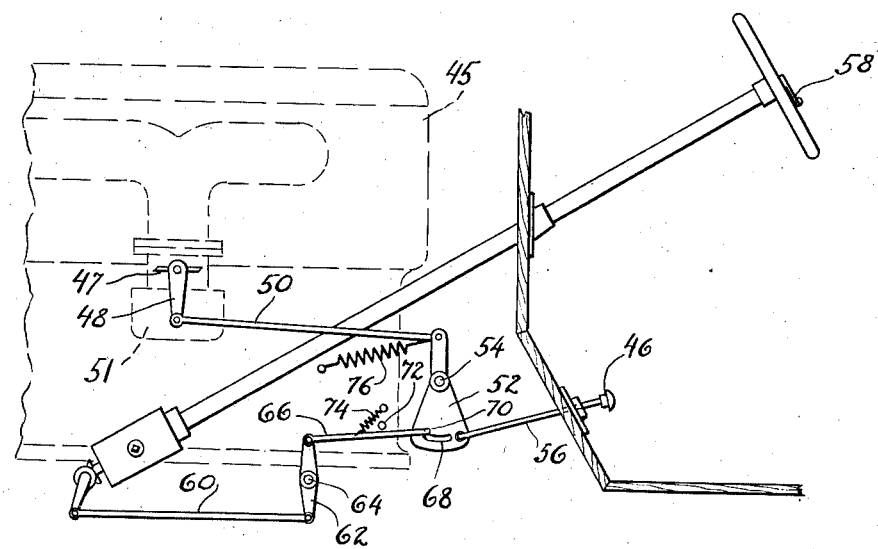

Referring now to the drawing wherein like numerals refer to like parts throughout the several figures and wherein Fig. 1 is a diagrammatic illustration of the electric brake hook up suggested above, and Fig. 2 is a somewhat diagrammatic illustration of the automatic motor idling speed control.

The numeral 10 indicates broadly an electrically operable brake mechanism associated with each wheel of a motor vehicle. A circuit breaker 12 positioned on the instrument panel of the vehicle provides the primary control for the system whereby the circuit as a whole may be opened or closed. Each of the independent brake assemblies associated with each of the four wheels is tied into the electric circuit through the leads 14 and 16, and the flow of current through the circuit is controlled by the rheostat diagrammatically illustrated by numeral 18, which is in turn controlled by a finger 20 which is actuated in unison with the brake pedal 22. This control 18 may be of any desired type whereby movement of the finger 20 across the contacts varies the resistance in the circuit. The type of control utilized is unimportant, obviously, and my invention comprehends the use of any type of current control.

The leads 14 and 16 are connected respectively with the switch blades 24 and 26 of a relay switch which is operated by the magnetic relay 28. Current for actuating the magnetic relay is drawn from the generator 30 through the leads 32 and 34 and when sufficient current is being generated by the generator, the sufficiency of which is predetermined, the magnetic relay retains the switch blades 24 and 26 in their uppermost position where they make contact with the leads 36 and 38 from the generator 30. With the circuit breaker 12 closed and the relay switch blades in this position the generator provides the power source for the brakes.

The structure whereby the motor 45 is automatically maintained at a predetermined speed is illustrated clearly in Fig. 2. A butterfly valve 47 on the carburetor is adapted to be actuated by movement of lever 48, link 50 and a sector-like element 52 pivoted, as indicated at 54, intermediate its extremities. The accelerator 46 is pivotally connected by rod 56 with the lower sector portion of element 52. The hand throttle 58 is hooked up in conventional fashion through the rod 60 to one extremity of a lever 62 which is pivoted intermediate its ends as at 64. The opposite extremity of the lever 62 is connected to the sectorlike element 52 through the rod 66 in the manner now to be described.

The sector portion of the element 52 is provided with an arcuate slot 68. At the forward end of this slot there is an upwardly directed straight extension 70 and the lever 66 is provided at its extremity with a pin, or any other suitable part adapted to seat within the slot. A stop pin 72 functions to limit the upward movement of rod 66, determining what might be called the normal minimum running position of the throttle valve, and a coil spring 74 tends to maintain the said rod against the said stop. The coil spring 76 functions to retain the sector-like element 52 in such position as to force the accelerator 46 to its uppermost position.

The operation of the assembly will be clear from the drawing and the foregoing description, and is briefly as follows:

In Fig. 2 the elements are shown in the position for actual idling of the motor. In this position the electrical energy for operation of the brakes is provided by the storage battery. Depression of accelerator pedal 46 positively actuates the element 52, forcing the same to swing in a clockwise direction about its pivot point 54. During this movement the lever 48 is being actuated by the link 50 to open the butterfly valve of the carburetor 51 the internal combustion engine 45 which propels the vehicle.

The rear extremity of rod 66 will at first be actuated by the moving sector by virtue of the fact that the pin at said extremity which rides in the extension 70 of slot 68 is positively actuated. This will result in moving the hand throttle lever 58 until the rod 66 strikes the stop pin 72 and as the sector element 52 continues to swing upwardly the pin at the extremity of rod 66 will ride along slot 68, thereby permitting further opening of the carburetor valve by means of the accelerator pedal 46 without further actuating of hand throttle 58. The stop pin 72 in its relation to rod 66 therefore determines that position of the hand throttle lever which determines the normal minimum running position of the throttle valve when the accelerator is released.

Upon release of the accelerator pedal 46 by the vehicle operator the retraction spring 76 will function to withdraw the sector-like element in a counter clockwise direction, thereby tending to close the carburetor valve. However, such rotation of element 52 brings the left hand extremity of slot 68 into coincidence with the pin on the end of rod 66, and the pin will then be drawn into the extension 70 of slot 68 and the resistance offered to further counter clockwise movement of element 52 by the friction in the hand throttle linkage as well as spring 74 will prevent further rotation and hence further closing of the carburetor valve. The springs and linkage are so designed that the R. P. M. of the motor at this point of stoppage will equal a predetermined value heretofore indicated as from 500-600 R. P. M. This motor speed is entirely satisfactory under prevailing driving conditions and is adapted to provide sufficient electrical energy through the generator to operate the brakes satisfactorily.

It is obvious, however, that the operator of the vehicle may wish to idle his motor and for this it is necessary only that he retract the hand throttle 58 which results in complete retraction in a counter clockwise direction of sector element 52 by means of linkage 60, 62, and 66 to close the carburetor valve to idling speed. This point might be called the absolute minmum running position of the throttle valve..

What I claim is:

1. Control mechanism for an internal combustion engine having a throttle control valve comprising, in combination, an actuating arm for said valve, a lever pivoted intermediate its end and pivotally coupled at one end with said actuating arm, an accelerator pedal pivotally coupled with the other end of said lever, and a hand throttle coupled through intermediate linkage with said last mentioned end of said lever, the lever connection itself comprising an arcuate slot in said lever and a pin slidably engaged therein, said slot including a radially offset portion adjacent the end opposite that side of the lever to which the accelerator is coupled.

2. In combination with a carburetor having a valve actuating arm, an accelerator pedal, a member operatively coupling said actuating arm and said pedal, a hand throttle, and an initially ineffective lost motion connection coupling said hand throttle with said member whereby depression of the accelerator pedal from its normal motor idling position initially advances said hand throttle a limited extent to reset the motor idling position of said accelerator.

3. Control mechanism for an automotive vehicle having an internal combustion engine including fuel feed apparatus provided with a throttle valve comprising, in combination, a hand lever, a member operatively coupling said lever with the valve to determine its minimum opening, and an accelerator coupled with the valve to actuate the same, said hand lever coupling including means operable on actuation of the accelerator to initially advance the hand lever a limited extent and subsequently release the same whereby the valve is automatically reset upon depression of the accelerator to provide an opening greater than its absolute minimum.

ADIEL Y. DODGE.